(12) United States Patent
Szmania et al.

(10) Patent No.: US 11,220,933 B2
(45) Date of Patent: Jan. 11, 2022

(54) VALVE LIFTER ANTI-ROTATION DEVICE HAVING CANTILEVER BRIDGE

(71) Applicant: Caterpillar Inc., Peoria, IL (US)

(72) Inventors: Terrence Lee Szmania, Chillicothe, IL (US); Vikram Kulkarni, Shrirampur (IN); Kshitij Anilkumar Shah, Dunlap, IL (US); Sivakumar Dharmaraj, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/865,979

(22) Filed: May 4, 2020

(65) Prior Publication Data

US 2021/0340889 A1 Nov. 4, 2021

(51) Int. Cl.

| F01L 1/18 | (2006.01) |
|---|---|
| F01L 1/46 | (2006.01) |
| F01L 1/047 | (2006.01) |
| F16H 25/14 | (2006.01) |
| F01L 1/14 | (2006.01) |
| F16H 53/06 | (2006.01) |

(52) U.S. Cl.
CPC ............ *F01L 1/46* (2013.01); *F01L 1/047* (2013.01); *F01L 1/146* (2013.01); *F01L 1/181* (2013.01); *F16H 25/14* (2013.01); *F16H 53/06* (2013.01)

(58) Field of Classification Search
CPC ... F01L 1/46; F01L 1/181; F01L 1/047; F01L 1/146; F16H 53/06; F16H 25/14
See application file for complete search history.

(56) References Cited

U.S. PATENT DOCUMENTS

| 3,267,919 A | 8/1966 | Wortman |
| 4,773,359 A | 9/1988 | Titolo |
| 5,088,455 A | 2/1992 | Moretz |
| 5,261,361 A | 11/1993 | Speil |
| 5,501,187 A | 3/1996 | Speil et al. |
| 5,546,899 A | 8/1996 | Sperling et al. |
| 5,678,514 A | 10/1997 | Mazella et al. |
| 6,257,189 B1 | 7/2001 | Moretz et al. |
| 7,121,244 B2 | 10/2006 | Roe |
| 7,311,074 B2 | 12/2007 | Sailer et al. |
| 7,373,907 B2 | 5/2008 | Balaraman |
| 8,181,616 B2 | 5/2012 | Sailer et al. |
| 8,826,874 B2 | 9/2014 | Hattiangadi et al. |
| 8,875,676 B2 | 11/2014 | Geyer et al. |
| 9,772,022 B2 | 9/2017 | Berruet et al. |
| 9,920,659 B2 | 3/2018 | Ahmed et al. |
| 2006/0169227 A1* | 8/2006 | Keller ............. F01L 1/146 123/90.5 |
| 2007/0119398 A1 | 5/2007 | Riley |
| 2009/0007871 A1 | 1/2009 | Bugescu |

* cited by examiner

*Primary Examiner* — Zelalem Eshete
(74) *Attorney, Agent, or Firm* — Brannon Sowers & Cracraft

(57) ABSTRACT

An engine valve actuation system includes a camshaft, rotatable in an engine, and a compound collar including a mounting sleeve, a guide sleeve, and a bridge cantilevering the guide sleeve to the mounting sleeve. A first valve lifter is interference-fitted in the mounting sleeve, and a second valve lifter is slip-fitted within the guide sleeve. First and second lifter bores receiving the first and second valve lifters are congruent, and the first and second valve lifters may be substantially identical. The compound collar reciprocates with the interference fitted first valve lifter, slidably receives the slip-fitted second valve lifter, and limits in-service rotation of both.

19 Claims, 4 Drawing Sheets

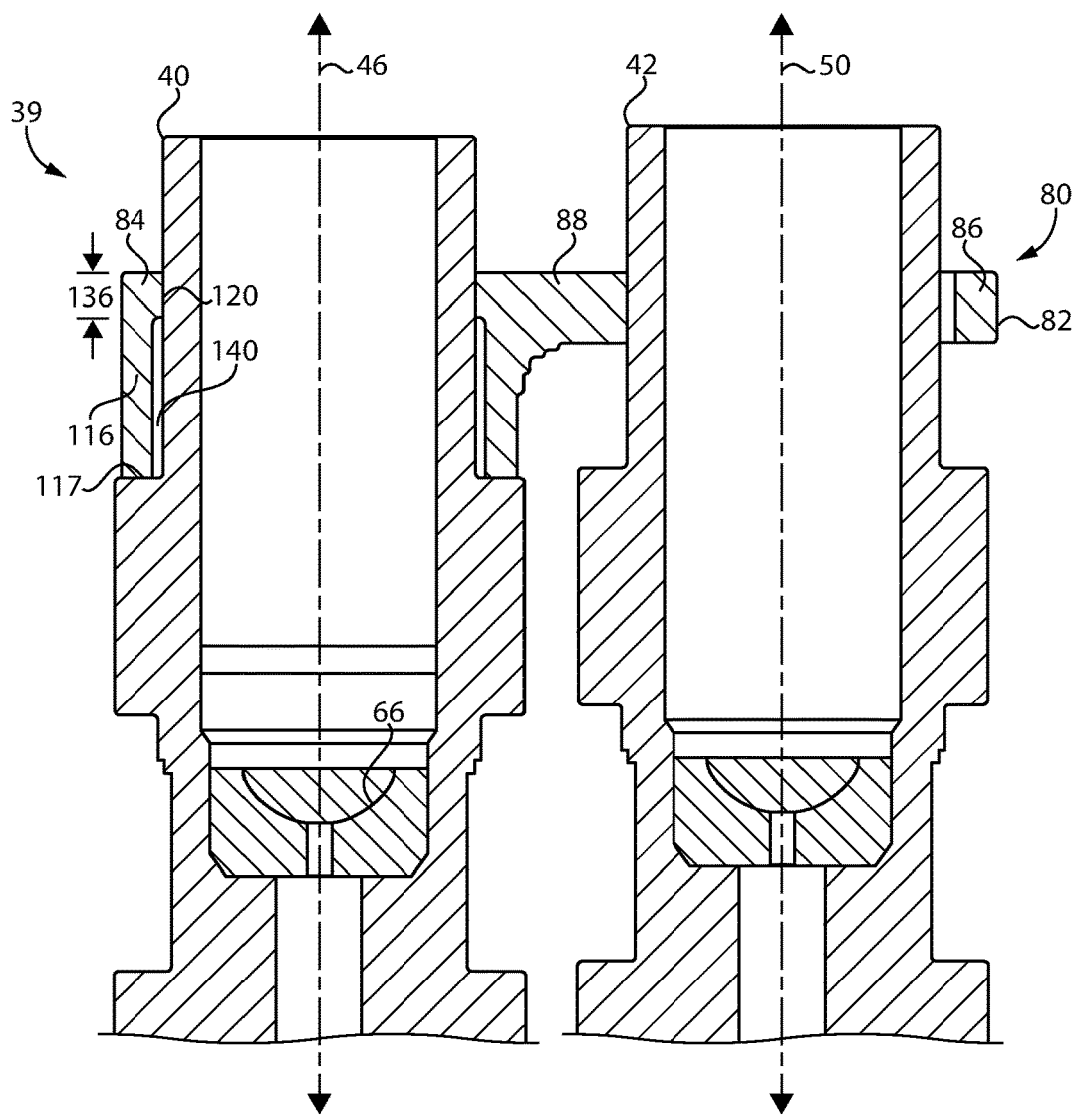
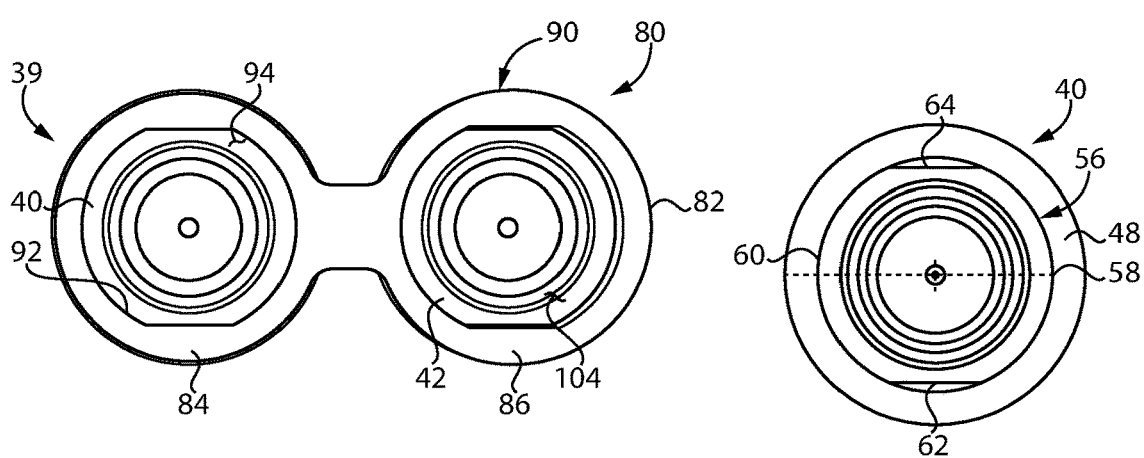
FIG. 4
FIG. 5        FIG. 6

VALVE LIFTER ANTI-ROTATION DEVICE HAVING CANTILEVER BRIDGE

TECHNICAL FIELD

The present disclosure relates generally to a valve actuation system, and more particularly to an anti-rotation device for valve lifters.

BACKGROUND

Internal combustion engines typically employ numerous valves to control the fluid connections amongst different parts of the engine, such as intake valves and exhaust valves to open and close intake and exhaust connections to a combustion cylinder. It is common for engine valve actuation to be achieved by a mechanical linkage between a crankshaft of the engine and one or more rotating camshafts, in turn rotatable to actuate the valves. In a typical valve actuation system the camshaft is rotated by a cam gear in mesh with an engine flywheel, and includes a plurality of non-circular cams that engage valve lifters to open engine valves, and permit the engine valves to be closed with biasing springs. Rocker arms are provided to reciprocate back and forth to open and close the valves, with pushrods or other intervening hardware coupling the valve lifters to the rocker arms.

In operation, cam followers such as rollers directly contact the cams and enable the valve lifters to reciprocate within bores in the engine housing. Proper operation generally requires an angular orientation of the valve lifters to be maintained relative to their axes of reciprocation, or permitted to rotate within a relatively tightly controlled range. Internal combustion engine operation is a dynamic process, however. Valve lifters can become misaligned, potentially requiring service or even resulting in catastrophic engine failure. Many designs for limiting rotation of valve lifters have been proposed over the years, ranging from geometry of the valve lifters themselves, relative to one another and/or relative to the engine housing, to specialized spring clips coupled with valve lifters and structured to engage with parts of the engine housing. One known anti-rotation roller valve lifter is set forth in U.S. Pat. No. 8,826,874. The '874 patent proposes a roller lifter having a first end with a first diameter, and a second end with a greater diameter and having a flat surface configured to engage a corresponding flat surface on an adjacent lifter. The strategy set forth in the '874 patent may have various applications, but there is always room for improvement and development of alternative strategies.

SUMMARY OF THE INVENTION

In one aspect, a compound collar for limiting in-service rotation of valve lifters in an engine includes a one-piece collar body having a mounting sleeve, a guide sleeve, a bridge attaching the guide sleeve to the mounting sleeve, and an outer peripheral surface formed in part upon each of the mounting sleeve, the guide sleeve, and the bridge. The mounting sleeve includes a first inner peripheral surface forming a first lifter bore, for receipt of a first valve lifter, and the first lifter bore defining a first collar axis, a first major diameter, and a first minor diameter. The guide sleeve includes a second inner peripheral surface forming a second lifter bore, for receipt of a second valve lifter, and the second lifter bore defining a second collar axis, a second major diameter, and a second minor diameter. The first lifter bore and the second lifter bore are congruent. The second lifter bore is enlarged, relative to the first lifter bore, based on a size of at least one of the second major diameter or the second minor diameter compared to sizes of the first major diameter and the first minor diameter.

In another aspect, a valve lifter assembly includes a compound collar for limiting in-service rotation of valve lifters, including a mounting sleeve having a first inner peripheral surface forming a first lifter bore, a guide sleeve having a second inner peripheral surface forming a second lifter bore, a bridge attaching the guide sleeve to the mounting sleeve, and an outer peripheral surface formed in part upon each of the mounting sleeve, the guide sleeve, and the bridge. The valve lifter assembly further includes a valve lifter having a first lifter end and a second lifter end, a lifting surface facing a direction of the first lifter end, a cam follower mounted to the second lifter end, and the first lifter end is positionable in either of the first lifter bore or the second lifter bore. The second lifter bore is enlarged relative to the first lifter bore and congruent with the first lifter bore, such that the valve lifter has an interference-fit installation configuration with the mounting sleeve and a slip-fit installation configuration with the guide sleeve.

In still another aspect, an engine valve actuation system includes a camshaft having a first cam and a second cam, and rotatable about a cam axis of rotation. The system further includes a compound collar having a mounting sleeve with a first inner peripheral surface forming a first lifter bore, a guide sleeve having a second inner peripheral surface forming a second lifter bore, and a bridge attaching the guide sleeve to the mounting sleeve. The system further includes a first valve lifter interference-fitted within the first lifter bore and including a lifting surface structured to actuate a first valve in an engine, and a cam follower in contact with the first cam to reciprocate the first valve lifter in response to rotation of the first cam. The system further includes a second valve lifter slip-fitted within the second lifter bore and including a lifting surface structured to actuate a second valve in the engine, and a cam follower in contact with the second cam to reciprocate the second valve lifter in response to rotation of the second cam. The first lifter bore and the second lifter bore are congruent, and the first valve lifter and the second valve lifter are substantially identical.

BRIEF DESCRIPTION OF THE DRAWINGS

FIG. 4 is a sectioned side diagrammatic view of a valve lifter assembly, according to one embodiment;

FIG. 5 is a top view of a valve lifter assembly, according to one embodiment;

FIG. 6 is a top view of a valve lifter, according to one embodiment;

DETAILED DESCRIPTION

Figure 1:
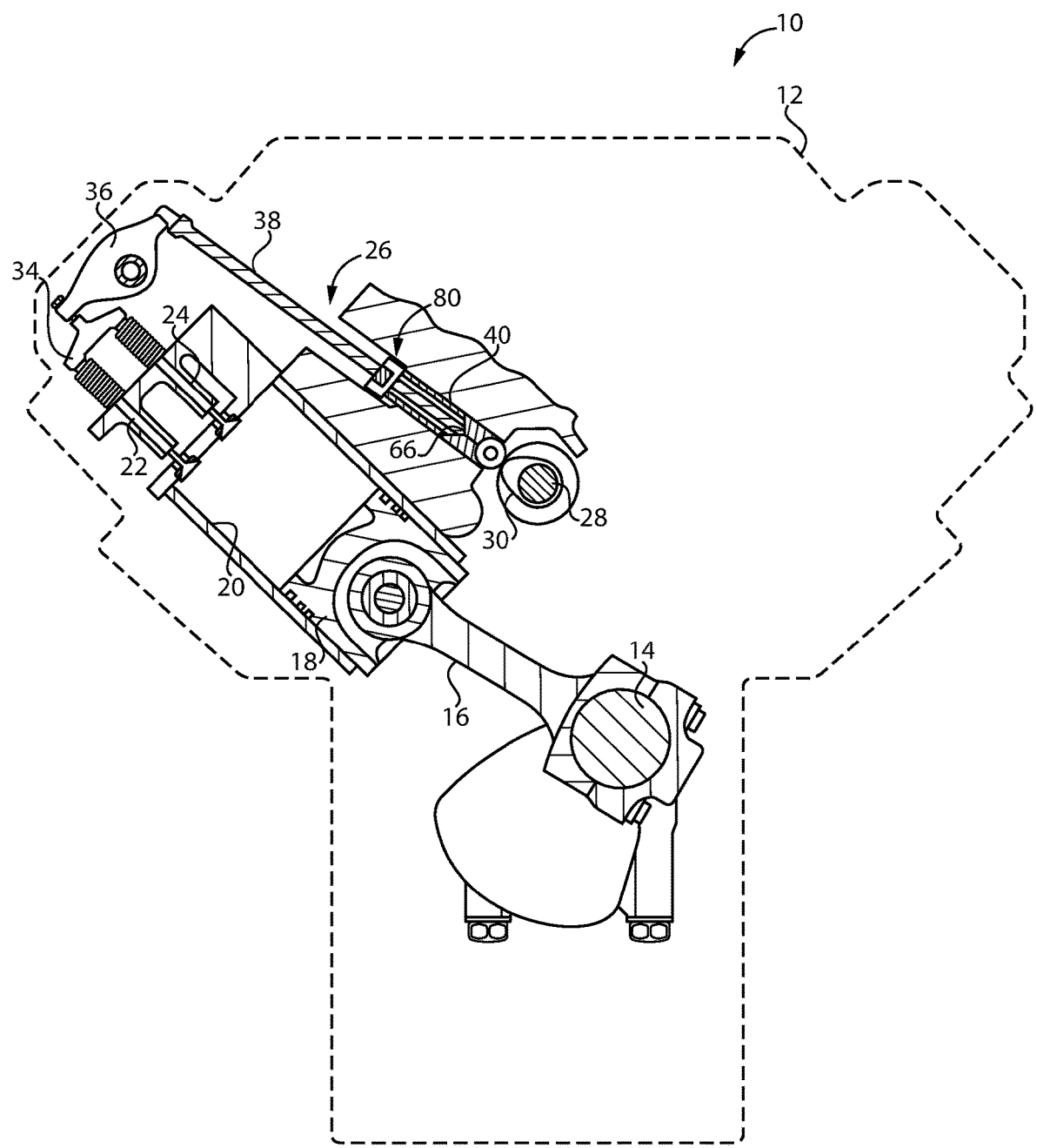
FIG. 1 is a sectioned view of an engine, according to one embodiment.

Referring to FIG. 1, there is shown an engine 10 according to one embodiment. Engine 10 includes an internal combustion engine, such as a compression-ignition diesel engine structured to operate on diesel distillate fuel, however, the present disclosure is not thereby limited. Engine 10 includes an engine housing 12, and a crankshaft 14 supported for rotation in engine housing 12. One or more combustion cylinders 20 are formed in engine housing 12, with a piston 18 structured to reciprocate in each combustion cylinder 20 between a top-dead-center position and a bottom-dead-center position in a conventional four-cycle pattern. Combustion cylinders 20, one of which is shown and referred to in the singular hereinafter, may be arranged in any suitable configuration such as a V-pattern, an in-line pattern, or still another. A connecting rod 16 couples crankshaft 14 to piston 18 in a generally conventional manner. A first engine valve 22 and a second engine valve 24 are structured to open and close fluid communication between combustion cylinder 20 and gas exchange conduits formed in engine housing 12. One of engine valves 22 and 24 can include an intake valve and the other an exhaust valve, however, in a practical implementation strategy both of engine valves 22 and 24 are intake valves or exhaust valves, with a valve bridge 34 coupling engine valves 22 and 24 to a common rocker arm 36. It will be appreciated that additional engine valves can be associated with combustion cylinder 20, but are not visible in the view of FIG. 1.

Rocker arm 36 is part of an engine valve actuation system 26. Valve actuation system 26 may include a rotatable camshaft 28 that is coupled to rotate with crankshaft 14, such as by way of suitable intervening gearing. Valve actuation system 26 further includes a plurality of valve lifters, one of which is shown at 40. Valve lifter 40 is coupled by way of a pushrod 38 with rocker arm 36 and reciprocates in engine housing 12 to reciprocate rocker arm 36 to open and close engine valves 22 and 24 together. Valve lifter 42 includes a lifting surface 66 that is contacted by pushrod 38. In other embodiments, a valve lifter might be associated with a single engine valve, or might be directly coupled with a rocker arm, or reciprocated to actuate an engine valve according to still another architecture. A compound collar 80, for limiting in-service rotation of valve lifter 40 and another valve lifter not visible in FIG. 1, is shown coupled with valve lifter 40 in FIG. 1, the details and functionality of which are further discussed herein.

Figure 2:
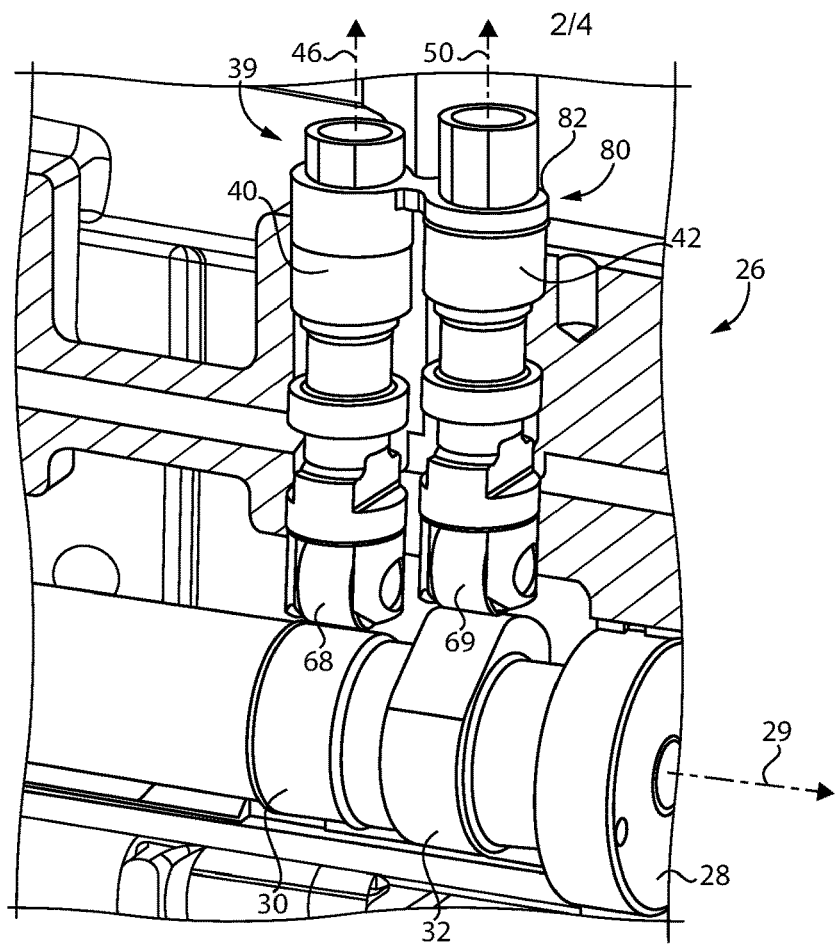
FIG. 2 is a partially sectioned diagrammatic view, in perspective, of a portion of the engine of FIG. 1.
Figure 3:
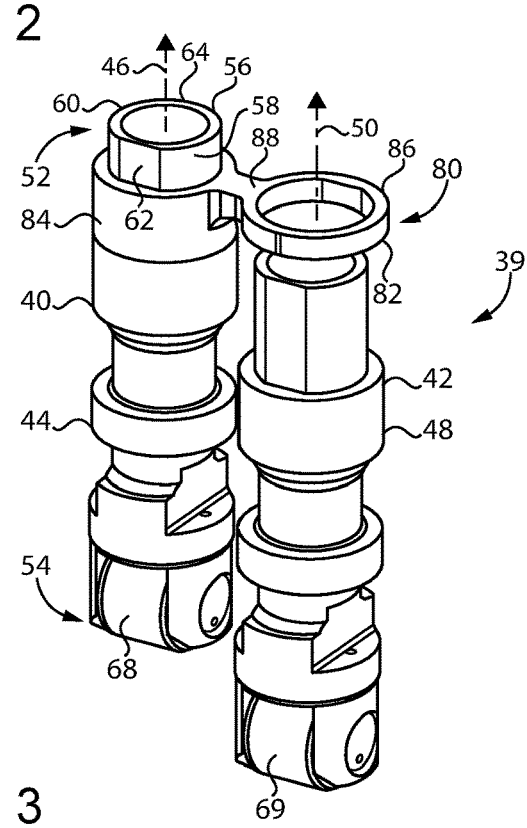
FIG. 3 is a diagrammatic view of a valve lifter assembly, according to one embodiment.

Referring now to FIGS. 2 and 3, there are shown additional details of valve actuation system 26, including a valve lifter assembly 39. Valve lifter assembly 39 includes valve lifter 40 (a "first" valve lifter), and a second valve lifter 42. It should be appreciated that description and discussion herein of either of valve lifters 40 or 42 can be understood to refer by way of analogy to the other of valve lifters 40 and 42, except where otherwise indicated or apparent from the context. Accordingly, the terms "first" and "second" are used herein merely for convenience. Valve lifter 40 and valve lifter 42 may be substantially identical, apart from differences incidental to manufacturing, and are interchangeable for service in engine 10. The present disclosure is not strictly limited, however, and in some instances the present teachings could be applied to valve lifters having different configurations.

Valve lifter 40 includes an elongate lifter body 46, defining a longitudinal lifter axis 46. Valve lifter 42 includes an elongate lifter body 48 defining a longitudinal lifter axis 50. Lifter axes 46 and 50 may be oriented perpendicular to a cam axis of rotation 29 about which camshaft 28 is rotated. In the illustrated embodiment, camshaft 28 includes a first cam or cam lobe 30 having a first cam profile about cam axis of rotation 29, and a second cam or cam lobe 32 having a second cam profile different from the first cam profile, about cam axis of rotation 29. The first cam profile and the second cam profile may be substantially identical in shape, but have different angular orientations about cam axis of rotation 29. Valve lifter 40 may be structured to actuate one or more intake valves in engine 10, and valve lifter 42 structured to actuate one or more exhaust valves in engine 10, or vice versa. Each of valve lifters 40 and 42 may be coupled to compound collar 80, as further discussed herein. In valve lifter 40, as shown in FIG. 3, lifter axis 46 extends between a first lifter end or axial body end 52 and a second lifter end or axial body end 54. Valve lifter 40 and valve lifter 42 may each include a lifting surface, shown in valve lifter 40 at 66 as noted above, that faces a direction of the corresponding first lifter end 52. Valve lifter 40 includes a cam follower 68 mounted to second lifter end 54. Valve lifter 42 includes a cam follower 69 analogously mounted. Each of cam followers 68 and 69 may include a roller in contact with the corresponding cam 30 and 32, respectively. Contact between cam follower 68 and first cam 30 enables valve lifter 40 to reciprocate in response to rotation of cam 30. Contact between cam follower 69 and cam 32 enables valve lifter 42 to reciprocate in response to rotation of cam 32.

As further illustrated, valve lifter 40, and by analogy valve lifter 42, includes a necked-down portion 56. Necked-down portion 56 may include a plurality of arcuate outer surfaces 58 and 60, and a plurality of planar outer surfaces 62 and 64, in an alternating arrangement. The substantially identical configurations of valve lifter 40 and valve lifter 42, and their configurations relative to compound collar 80, enables coupling of either of valve lifters 40 and 42 with compound collar 80 in either of two configurations, including an interference-fit installation configuration with one part of compound collar 80 or a slip-fit installation configuration with another part of compound collar 80, as further discussed herein. Valve lifter assembly 39 could be provided as an assembly of one or more of valve lifters 40 and 42 in combination with compound collar 80 in either or both of the installation configurations, such as in a service package, kit, or other aftermarket assembly. As will be further apparent from the following description, compound collar 80 may be fixedly coupled to a first one of valve lifters 40 and 42 by way of an interference-fit, and slip-fitted with a second one of valve lifters 40 and 42, when positioned and installed for service in engine 10. Coupling of compound collar 80 with valve lifters 40 and 42 when installed in engine 10 will permit reciprocation of each of valve lifters 40 and 42, but limit rotation of each of valve lifters 40 and 42 or restrict rotation within a relatively narrow range.

Referring also now to FIG. 5, there is shown a top view of valve lifter assembly 39 illustrating valve lifters 40 and 42 as they might appear coupled with and positioned in compound collar 80. Compound collar 80 includes a one-piece collar body 82 having a mounting sleeve 84, a guide sleeve 86, a bridge 88 attaching guide sleeve 86 to mounting sleeve 84 in a cantilevered fashion, and an outer peripheral surface 90 formed in part upon each of mounting sleeve 84, guide sleeve 86, and bridge 88. Outer peripheral surface 90 may be curvilinear upon each of mounting sleeve 84 and guide sleeve 86. Referring also to FIG. 6, there is shown valve lifter 40, including a top view illustrating a profile of surfaces 62, 64, 60, and 58. It will be noted that valve lifter 40, including necked-down portion 56, has a shape that is complementary to internal shapes of mounting sleeve 84, and guide sleeve 86. It will be recalled, however, that valve lifter 40 may have an interference-fit installation configuration with one part of compound collar 80, mounting sleeve 84, and a slip-fit installation configuration with another part of compound collar 80, guide sleeve 86. Valve lifter 42 can be analogously coupled in either configuration with compound collar 80. Thus, when assembled for service in engine 10, as shown in FIG. 5, reciprocation of valve lifter 40 will cause compound collar 80 to reciprocate in and out of the page, and relative to valve lifter 42. Accordingly, valve lifter 42 can also reciprocate relative to compound collar 80 and valve lifter 40 in and out of the page in the view of FIG. 5.

Referring now also to FIGS. 4, 7, 8, and 9, one-piece collar body 82 may include an upper end surface 112 that is planar and continuous upon mounting sleeve 84, guide sleeve 86, and bridge 88. Guide sleeve 86 may include a first lower end surface 114 that is planar and arranged opposite to upper end surface 112. Mounting sleeve 84 may include a downwardly depending sleeve wall 116 having a second lower end surface 118 that is arranged opposite to upper end surface 112 and axially outward of first lower end surface 114. Second lower end surface 118 is planar and extends circumferentially around a first lifter bore 94 discussed hereinafter, upon sleeve wall 116, and forms an annular stop surface to contact an annular stop 117 upon valve lifter 40. Thus, during interference-fitting of compound collar 80 with valve lifter 40, one-piece collar body 82 can be pressed onto necked-down portion 56 until such point as second lower end surface 118 contacts annular stop 117.

Mounting sleeve 84 includes a first inner peripheral surface 92 forming first lifter bore 94, for receipt of valve lifter 40. Guide sleeve 86 includes a second inner peripheral surface 102 forming a second lifter bore 104, for receipt of valve lifter 42. First lifter bore 94 and second lifter bore 104 are congruent. In a practical implementation, first lifter bore 94 and second lifter bore 104 may have substantially identical shapes, with substantially identical angular orientations about their respective axes in compound collar 80, but differ slightly with regard to size. This arrangement enables the interference fit installation configuration of either of valve members 40 or 42 with mounting sleeve 84, and the slip-fit installation configuration of either of valve members 40 or 42 with guide sleeve 86. Shapes not identical in form but having generally coinciding major and minor axes when superimposed may also be considered congruent within the context of the present disclosure. Shapes not identical in form and not having coinciding major and minor axes when superimposed are not likely considered congruent.

First lifter bore 94 defines a first collar axis 96, a first major diameter 98, and a first minor diameter 100. Second lifter bore 104 defines a second collar axis 106, a second major diameter 108, and a second minor diameter 110. Second lifter bore 104 is enlarged, relative to first lifter bore 94, based on a size of at least one of second major diameter 108 or second minor diameter 110 compared to sizes of first major diameter 98 and first minor diameter 100, for slip-fitting valve lifter 42 in second lifter bore 104 versus interference-fitting valve lifter 40 in first lifter bore 94.

Figure 7:
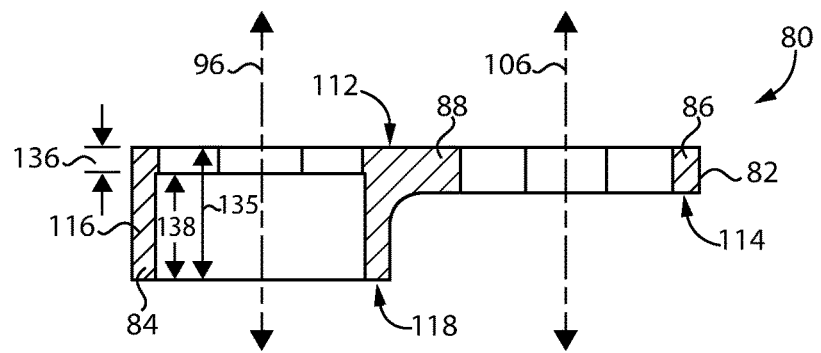
FIG. 7 is a sectioned side diagrammatic view of a compound collar according to one embodiment.
Figure 8:
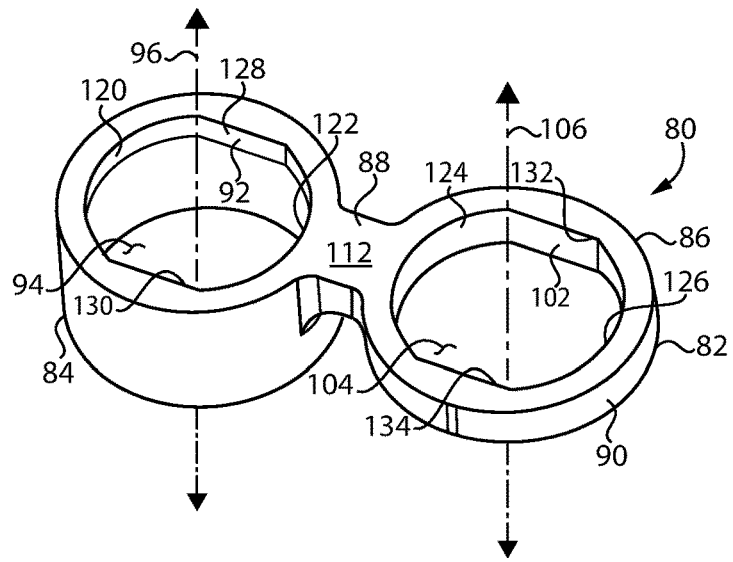
FIG. 8 is a perspective view of a compound collar, according to one embodiment.

It can also be noted, as best depicted in FIG. 4 and FIG. 7, that first inner peripheral surface 92 defines a full axial length 135, parallel to first collar axis 96, extending from upper end surface 112 to second lower end surface 118. First major diameter 98 may have a larger size along a minority of full axial length 135, and a smaller size along a minority of full axial length 135 so as to define an interference-fit length 136. First major diameter 98 may have a larger size along a majority of full axial length 135 defining a clearance-fit length 138. Interference-fit length 136 between first lifter end 52 and mounting sleeve 84 may be equal to a minority of full axial length 135. Clearance-fit length 138 between first lifter end 52 and mounting sleeve 84 may be equal to a majority of full axial length 135. First inner peripheral surface 92 could have a cylindrical shape along clearance-fit length 138.

Figure 9:
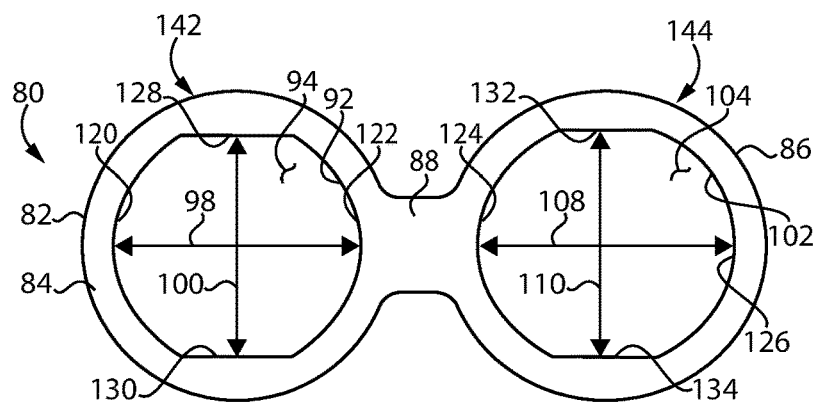
FIG. 9 is a top view of a compound collar, according to one embodiment.

Thus, it can be seen from FIGS. 4 and 7 that only a relatively small portion of first inner peripheral surface 92 is press fit with valve lifter 40, and a clearance 140 is formed between downwardly depending sleeve wall 116 and valve lifter 40. Downwardly depending sleeve wall 116 can contact or bottom-out against annular stop 117 on valve lifter 40. In a further practical implementation, second lifter bore 104 is enlarged, relative to first lifter bore 94, based on a size of both second major diameter 108 and second minor diameter 110 compared to sizes of first major diameter 98 and first minor diameter 100. In some embodiments, second major diameter 108 is at least 3% larger than first major diameter 98 and second minor diameter 110 is at least 6% larger than first minor diameter 100. One-piece body 82 may have a footprint in an axial projection plane, as best depicted in FIG. 9, including a first circular arc 142 formed by outer peripheral surface 90 upon mounting sleeve 84 and originating and terminating at bridge 88. The footprint of one-piece body 82 may further include a mirror-image circular arc 144 formed by outer peripheral surface 90 upon guide sleeve 86 and also originating and terminating at bridge 88.

In the illustrated embodiment, each of first inner peripheral surface 92 and second inner peripheral surface 102 includes, respectively, arcuate inner walls 120, 122, and 124, 126, defining the respective first major diameter 98 and second major diameter 108. Arcuate inner walls 120, 122, and 124, 126 are in an alternating arrangement with planar inner walls 128, 130 and 132, 134 of first inner peripheral surface 92 and second inner peripheral surface 102, respectively, defining the respective first minor diameter 100 and second minor diameter 110. In other embodiments different inner peripheral surface configurations might be employed, such as oval configurations, various polygonal configurations, or any other non-circular shape suitable for interference-fitting, in the case of first inner peripheral surface 92, and slip-fitting, in the case of second inner peripheral surface 102, with valve lifters, while restricting rotation of the same.

INDUSTRIAL APPLICABILITY

Referring to the drawings generally, during operation of engine 10 a mixture of fuel and air is combusted in combustion cylinder 20 to urge piston 18 toward a bottom-dead-center position to rotate crankshaft 14 by way of connecting rod 16. Camshaft 28 is rotated, typically at one-half engine speed in a conventional four-cycle pattern, to cause valve lifters 40 and 42 to reciprocate to open and close the associated engine valves. Each of valve lifters 40 and 42 includes a lifting surface in contact with a pushrod structured to actuate the respective engine valves as described herein. Cam followers 68 and 69 contact cams 30 and 32 on camshaft 28 to reciprocate valve lifters 40 and 42 at suitable timings. Compound collar 80 is fixedly coupled to valve lifter 40, and slidably receives valve lifter 42. Contact between second inner peripheral surface 102 and valve lifter 42 inhibits rotation of valve lifter 42. The fixed coupling of valve lifter 40 to guide sleeve 86 causes compound collar 80 to move with valve lifter 40, relative to valve lifter 42, between a lifted position and a dropped position in response to rotation of camshaft 28, in particular rotation of cam 30.

In FIG. 2, valve lifter 40 is shown as it might appear approximately at a lowered position such that the associated engine valves are closed. Valve lifter 42 is shown as it might appear near a lifted position, such that the associated engine valves are open. As camshaft 28 is rotated from the state in FIG. 2, valve lifter 42 will reciprocate relative to compound collar 80 but be restricted from rotation about lifter axis 50, whereas valve lifter 40 and compound collar 80 will reciprocate together with valve lifter 40 also restricted from rotation about lifter axis 46. Alternative cam arrangements and cam profiles could yield different patterns of up and down reciprocation of valve lifters 40 and 42 relative to one another, but at any given time valve lifters 40 and 42 will be free to reciprocate dependent upon cam angle and inhibited from rotating, or restricted to rotation in a relatively tightly controlled, narrow range, for instance a range of plus or minus about 5°, about the respective lifter axes 46 and 50.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A compound collar for limiting in-service rotation of valve lifters in an engine comprising:
a one-piece collar body including a mounting sleeve, a guide sleeve, a bridge attaching the guide sleeve to the mounting sleeve, and an outer peripheral surface formed in part upon each of the mounting sleeve, the guide sleeve, and the bridge;
the mounting sleeve including a first inner peripheral surface forming a first lifter bore, for receipt of a first valve lifter, the first lifter bore defining a first collar axis, a first major diameter, and a first minor diameter;
the guide sleeve including a second inner peripheral surface forming a second lifter bore, for receipt of a second valve lifter, the second lifter bore defining a second collar axis, a second major diameter, and a second minor diameter;
the first lifter bore and the second lifter bore are congruent; and
the second lifter bore is enlarged, relative to the first lifter bore, based on a size of at least one of the second major diameter or the second minor diameter compared to sizes of the first major diameter and the first minor diameter.

2. The compound collar of claim 1 wherein the outer peripheral surface is curvilinear upon each of the mounting sleeve and the guide sleeve.

3. The compound collar of claim 2 wherein:
the one-piece collar body includes an upper end surface formed in part upon each of the mounting sleeve, the guide sleeve, and the bridge;
the guide sleeve includes a first lower end surface arranged opposite to the upper end surface; and
the mounting sleeve includes a downwardly depending sleeve wall having a second lower end surface arranged opposite to the upper end surface.

4. The compound collar of claim 3 wherein:
the first inner peripheral surface has a full axial length extending from the upper end surface to the second lower end surface; and
the first major diameter has a smaller size along a minority of the full axial length defining an interference-fit length, and a larger size along a majority of the full axial length defining a clearance-fit length.

5. The compound collar of claim 4 wherein:
the second lower end surface is located axially outward of the first lower end surface; and
the second lower end surface is planar and extends circumferentially around the first lifter bore upon the sleeve wall, and forms an annular stop surface to contact an annular stop upon the first valve lifter.

6. The compound collar of claim 2 wherein:
the one-piece body has a footprint, in an axial projection plane, including a first circular arc formed by the outer peripheral surface upon the mounting collar, and a mirror-image circular arc formed by the outer peripheral surface upon the guide sleeve; and
each of the first circular arc and the mirror-image circular arc originates and terminates at the bridge.

7. The compound collar of claim 1 wherein each of the first inner peripheral surface and the second inner peripheral surface includes arcuate inner walls, defining the respective first major diameter and second major diameter, in an alternating arrangement with planar inner walls, defining the respective first minor diameter and second minor diameter.

8. The compound collar of claim 7 wherein the second lifter bore is enlarged, relative to the first lifter bore, based on a size of both the second major diameter and the second minor diameter compared to sizes of the first major diameter and the first minor diameter.

9. The compound collar of claim 8 wherein the second major diameter is at least 3% larger than the first major diameter, and the second minor diameter is at least 6% larger than the first minor diameter.

10. A valve lifter assembly comprising:
a compound collar for limiting in-service rotation of valve lifters, including a mounting sleeve having a first inner peripheral surface forming a first lifter bore, a guide sleeve having a second inner peripheral surface forming a second lifter bore, a bridge attaching the guide sleeve to the mounting sleeve, and an outer peripheral surface formed in part upon each of the mounting sleeve, the guide sleeve, and the bridge;
a valve lifter including a first lifter end and a second lifter end, a lifting surface facing a direction of the first lifter end, a cam follower mounted to the second lifter end, and the first lifter end is positionable in either of the first lifter bore or the second lifter bore; and
the second lifter bore is enlarged relative to the first lifter bore and congruent with the first lifter bore, such that the valve lifter has an interference-fit installation configuration with the mounting sleeve and a slip-fit installation configuration with the guide sleeve.

11. The valve lifter assembly of claim 10 wherein:
the first lifter bore defines a first collar axis;
the first inner peripheral surface defines a full axial length;
the first lifter end is interference-fitted with the mounting sleeve within the first lifter bore;
an interference-fit length between the first lifter end and the mounting sleeve is equal to a minority of the full axial length; and
a clearance-fit length between the first lifter end and the mounting sleeve is equal to a majority of the full axial length.

12. The valve lifter assembly of claim 10 wherein the mounting sleeve includes a downwardly depending sleeve wall in contact with an annular stop on the valve lifter, and a clearance extends radially between the downwardly depending sleeve wall and the valve lifter.

13. The valve lifter assembly of claim 12 wherein each of the first inner peripheral surface and the second inner peripheral surface includes arcuate inner walls in an alternating arrangement with planar inner walls.

14. The valve lifter assembly of claim 13 wherein:
the first lifter bore defines a first collar axis, a first major diameter between the respective arcuate inner walls, and a first minor diameter between the respective planar inner walls;
the second lifter bore defines a second collar axis, a second major diameter between the respective arcuate inner walls, and a second minor diameter between the respective planar inner walls; and
the second lifter bore is enlarged, relative to the first lifter bore, based on a size of at least one of the second major diameter or the second minor diameter compared to sizes of the first major diameter and the first minor diameter.

15. The valve lifter assembly of claim 14 wherein the second lifter bore is enlarged, relative to the first lifter bore, based on a size of both the second major diameter and the second minor diameter compared to sizes of the first major diameter and the first minor diameter.

16. The valve lifter assembly of claim 10 wherein:
the compound collar has a footprint, in an axial projection plane, including a first circular arc formed by the outer peripheral surface upon the mounting sleeve, and a mirror-image circular arc formed by the outer peripheral surface upon the guide sleeve; and
each of the first circular arc and the second circular arc originates and terminates at the bridge.

17. An engine valve actuation system comprising:
a camshaft including a first cam and a second cam, and rotatable about a cam axis of rotation;
a compound collar including a mounting sleeve having a first inner peripheral surface forming a first lifter bore, a guide sleeve having a second inner peripheral surface forming a second lifter bore, and a bridge attaching the guide sleeve to the mounting sleeve;
a first valve lifter interference-fitted within the first lifter bore and including a lifting surface structured to actuate a first valve in an engine, and a cam follower in contact with the first cam to reciprocate the first valve lifter in response to rotation of the first cam;
a second valve lifter slip-fitted within the second lifter bore and including a lifting surface structured to actuate a second valve in the engine, and a cam follower in contact with the second cam to reciprocate the second valve lifter in response to rotation of the second cam;
the first lifter bore and the second lifter bore are congruent; and
the first valve lifter and the second valve lifter are substantially identical; and
wherein
the first lifter bore defines a first collar axis, a first major diameter, and a first minor diameter;
the second lifter bore defines a second collar axis, a second major diameter, and a second minor diameter; and
the second lifter bore is enlarged, relative to the first lifter bore, based on a size of at least one of the second major diameter or the second minor diameter compared to sizes of the first major diameter and the first minor diameter.

18. The system of claim 17 wherein:
the compound collar includes an upper end surface that is planar and continuous upon the mounting sleeve, the guide sleeve, and the bridge;
the guide sleeve includes a first lower end surface that is planar and arranged opposite to the upper end surface; and
the mounting sleeve includes a downwardly depending sleeve wall having a second lower end surface that is planar and arranged opposite to the upper end surface and axially outward of the first lower end surface.

19. The system of claim 17 wherein:
each of the first inner peripheral surface and the second inner peripheral surface includes arcuate inner walls, defining the respective first major diameter and second major diameter, in an alternating arrangement with planar inner walls, defining the respective first minor diameter and second minor diameter; and
the second lifter bore is enlarged, relative to the first lifter bore, based on a size of both the second major diameter and the second minor diameter compared to sizes of the first major diameter and the first minor diameter.

* * * * *